July 24, 1956
R. B. BEARD
2,755,669
BUBBLE TUBE
Filed Nov. 29, 1952
2 Sheets-Sheet 1
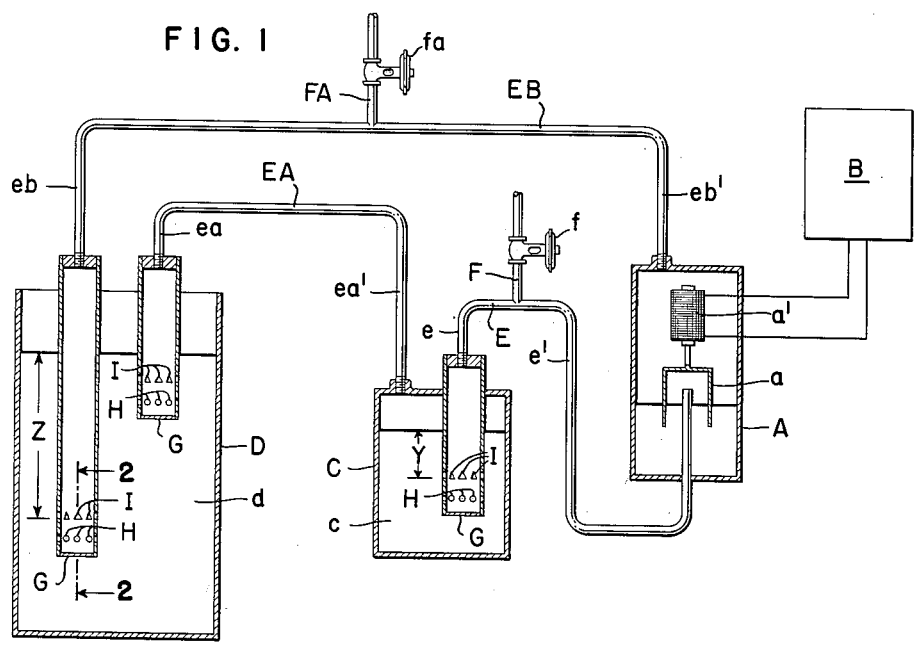
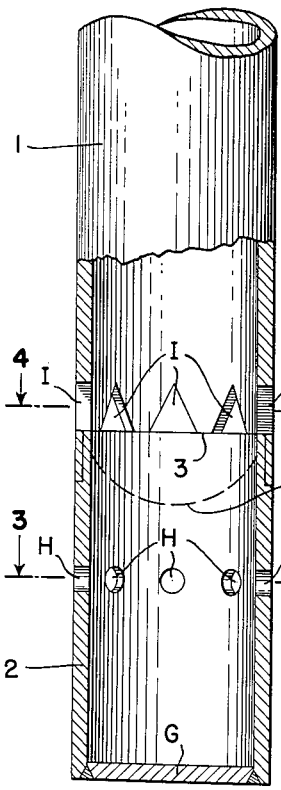
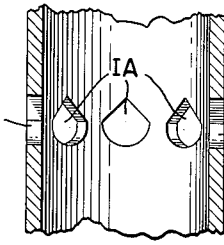
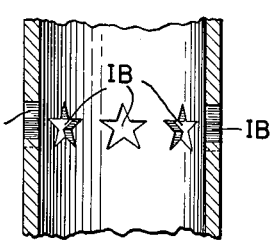
INVENTOR.
RICHARD B. BEARD
BY *Arthur H. Swanson*
ATTORNEY.

July 24, 1956 R. B. BEARD 2,755,669
BUBBLE TUBE
Filed Nov. 29, 1952 2 Sheets-Sheet 2
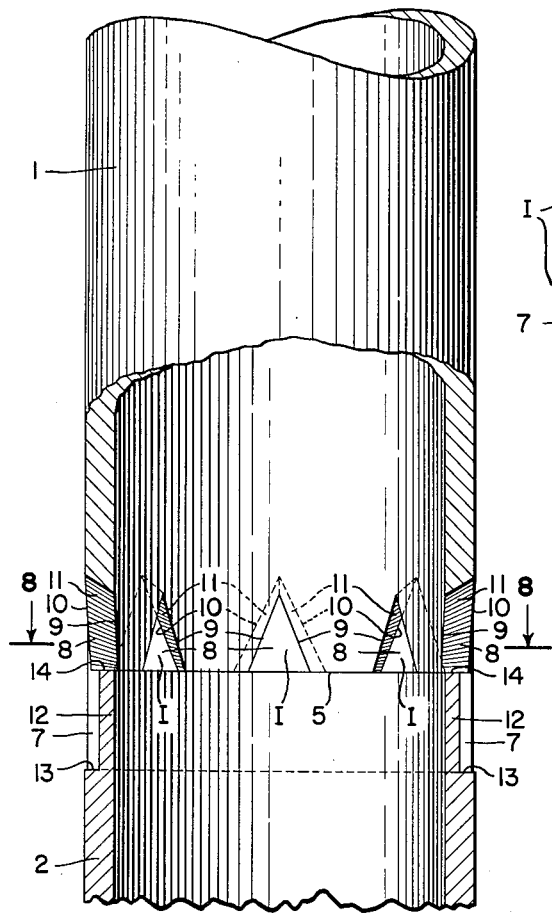
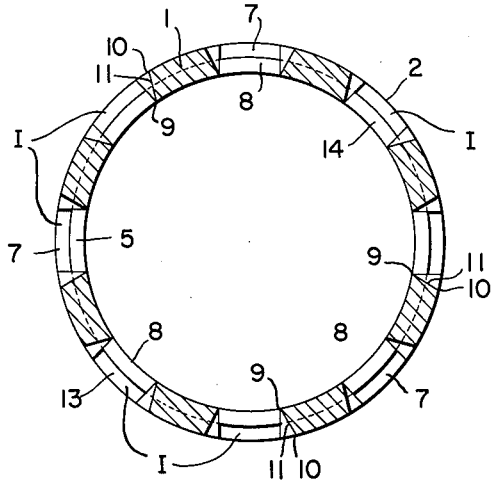
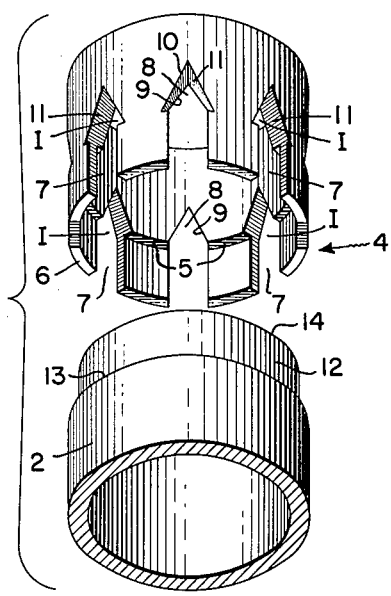
INVENTOR.
RICHARD B. BEARD
BY Arthur H. Swanson
ATTORNEY.

United States Patent Office 2,755,669
Patented July 24, 1956

2,755,669

BUBBLE TUBE

Richard B. Beard, Philadelphia, Pa., assignor to Minneapolis-Honeywell Regulator Company, Minneapolis, Minn., a corporation of Delaware Application November 29, 1952, Serial No. 323,247

2 Claims. (Cl. 73—439)

The general object of the present invention is to provide improved apparatus of a known type for measuring the specific gravity of a liquid which apparatus includes one or more so-called bubble tubes. Each such bubble tube has a lower end portion submerged in the liquid whose specific gravity is to be measured and is formed with one or more outlets or discharge orifices. Air (or other gas) is passed into each tube under such pressure and at such rate that the air will pass into the liquid through the tube discharge orifice or orifices in a series of bubbles. A measure of the gas pressure in the tube forms a measure of the density of the liquid into which the air is discharged. The air (or gas) pressure in the tube is commonly referred to as the "back pressure." The accuracy of the measurement varies with the form and dimensions of the tube and its discharge orifices. With a properly designed tube measurement errors can ordinarily be kept below one per cent under favorable condition.

Bubble tubes have long been used in the measurement of specific gravity of liquids and for other purposes, such as the measurement of the depth of water in ships and in other containers. Originally, each bubble tube was formed with its lower end open and transverse to the length of the tube. With such a tube, discharging one large bubble after another through its open end, the tube back pressure may vary as much as thirty per cent as each large bubble is formed and breaks away from the lower end of the tube. Ordinarily, in specific gravity measurements, back pressure variations should be kept quite small. Various special bubble tube orifice arrangements have been devised with that end in view. In particular, it has been proposed to close the lower end of the bubble tube and to form one or more lateral orifices in the tube above its closed lower end.

I have discovered that improved bubble tube operation can be obtained by the conjoint use of a bubble tube having a closed lower end and a circular row of circular orifices at one level and a circular row of triangular orifices at a higher level. I have also discovered that for optimum results the number and size of the orifices, the diameter of the bubble tube, the submergence depth of the orifices, and the density of the liquid into which the orifice is discharged should be suitably related to one another.

The various features of novelty which characterize my invention are pointed out with particularity in the claims annexed to and forming a part of this specification. For a better understanding of the invention, however, its advantages, and specific objects attained with its use, reference should be had to the accompanying drawings and descriptive matter in which I have illustrated and described a preferred embodiment of the invention.

Of the drawings:

Fig. 1 is a somewhat diagrammatic illustration of a specific gravity meter;

Fig. 2 is a sectional elevation of the lower portion of a bubble tube taken on the line 2—2 of Fig. 1;

Fig. 3 is a section on the line 3—3 of Fig. 2;

Fig. 4 is a section on the line 4—4 of Fig. 2; and

Figs. 5 and 6 are elevations which illustrate different modifications in the form of the upper, triangular orifices shown in Fig. 2.

Fig. 7 is a side elevation with parts in longitudinal cross section of a modification.

Fig. 8 is a transverse cross section on line 8—8 of Fig. 7 as viewed in the direction of the arrows.

Fig. 9 is a perspective view of two parts of the modification of the Figs. 7 and 8 during their process of assembly.

In Fig. 1 I have diagrammatically illustrated an embodiment of my invention in a gravity meter system of conventional type. The system shown comprises a bell-type, electric-meter A arranged to transmit a control current to an electrically controlled element B, which may be a controller, a recorder or a recorder-controller. The meter system, shown in Fig. 1, also includes a closed container C partially filled with a reference liquid, a container D containing the liquid whose gravity is to be determined, and connecting conduits E, EA, and EB.

The meter A has a body partially filled with liquid and includes a bell-shaped float $a$ having the lower end of its skirt portion extending into the liquid in the container A and supporting an armature $a'$ above the bell. The armature $a'$ forms part of a self-balancing impedance bridge circuit by which effects proportional to the movement of the part $a'$ are transmitted to the element B. The circuit $a'$ may be of the type shown in the Harrison Patent 1,743,582 of January 14, 1930.

The conduit E comprises an inverted, U-shaped portion with one leg $e$ extending down into the body of reference liquid $c$ which partially fills the chamber or tank C. The second depending leg $e'$ of the conduit E has an uprising, end portion which, as shown, extends through the bottom wall of the chamber or tank A and has its upper end opening into the hollow interior of the bell $a$ above the level of the liquid in the lower portion of the bell. The conduit EA also comprises an inverted, U-shaped portion with one depending leg $ea$ extending down into the upper portion of liquid $d$ in the container D. The other depending leg $ea'$ has its lower end attached to the upper end wall of the closed container C. The lower end of the arm $ea'$ is in communication with the air space in the container C above the liquid $c$ through an opening in the top wall of the container C. The conduit EB is also in the form of an inverted U and has a depending leg $eb$ extending down into the liquid $d$ in the container D, and has a second depending leg $eb'$, which is attached to the top wall of the container A and is in communication with the air space in that chamber through an opening in said top wall.

The lower end of the leg $eb$ is at a level below the level of the lower end of the leg $ea$. Air at a suitable pressure, which may be in the neighborhood of 15 pounds per square inch, is continuously supplied to the upper portion of the conduit E through a pipe F including a throttling valve $f$. Air at a similar pressure is continuously passed into the upper portion of the conduit EB through a pipe FA. The latter includes a regulated or throttling valve $fa$ and may be connected to the same source of air under pressure as is the pipe F. As shown, the lower end of each of the conduit legs $e$, $ea$ and $eb$ is closed by a horizontal plate or wall portion G at the lower end of the leg. The immediate purpose of the apparatus shown in Fig. 1 is to measure the difference between the air pressure in the conduits EA and EB. Insofar as above described, the apparatus shown in Fig. 1 contains nothing claimed as novel herein.

Figs. 2, 3 and 4 illustrate, in some detail, a preferred form of the novel orifice arrangement in the lower portion of the leg *eb*, which is a characteristic feature of the present invention. As collectively shown in Figures 2, 3, and 4, the leg portion *eb* is formed with a plurality of circular orifices or ports H arranged in a circle surrounding the axis of the leg *eb*. As shown, there are eight orifices H. Above the row of orifices H is a second circular row of orifices I. As shown in Fig. 3, there are eight orifices I equally spaced about the axis of the conduit leg *eb*. While the dimensions of the orifices H and I and the diameter of the leg *eb* may vary somewhat, in one practically desirable arrangement the outside diameter of the leg *eb* is one inch and its wall thickness is 0.065 inch, the diameter of each port H is ⅛ of an inch and its axis is radial to the axis of the leg. The thickness of the bottom wall plate may be about ⅛ of an inch and the axes of the ports H are ½ of an inch below the base line of each of the triangular ports I, and one inch above the lower end of the pipe leg *eb*.

The outer, side edges of each port I are shown as located at opposite sides of a plane including the axis of the tube and the point at which said edges intersect. Each of said edges is inclined to the other at an angle of 60°. Preferably, and as shown, the adjacent side wall surfaces of each port I are inclined toward one another, thereby decreasing the area of the inner end of each port I and making the distance between the bottom and top of each port I greater at the outer side of the wall of the tube EB than at the inner side of that wall. However, the ports I need not be flaring as described above. As shown best in Fig. 4, the ports I may be of equal area at the inner end and at the outer end of each port. Figs. 7, 8, and 9 show that modification in which the ports I have flaring side wall surfaces. In this modification section 1 of the bubble tube has a counterbore cut in its end surface so as to reduce the cross section of the end portion 4 of the wall and to leave a step 5 adjacent the end 6 of the section 1. Notches or slots 7 of uniform cross section are then cut in the end portion 4 of reduced cross section back as far as the step 5. The inner ends 8 of the notches or slots 7 are then cut in V or triangular shape so that the inner edges 9 of the V are shorter than the outer edges 10 thereof, thus leaving side walls 11 which slope or flare at an angle to the axis of the tube section 1. The end of the tube section 2 is also counterbored on its outer surface at 12 so as to leave a notch or step 13 in its outer surface. Tube sections 1 and 2 are then aligned, as shown in Fig. 9, and the end 4 of the tube section 1 is placed in the counterbore 12 of tube section 2. This causes the end surface 6 of tube section 1 to engage the step 13 of tube section 2 and the end section 14 of tube section 2 to engage the step 5 of tube section 1. The two tube sections 1 and 2 are then united by means of heat or by welding if the tube sections are of metal. To facilitate the accurate formation of the ports I, the pipe EB is divided into upper and lower, longitudinal sections 1 and 2. The lower end of the upper section 1 is recessed to form a space which receives the reduced upper end of the section 2. The upper end 3 of the telescopic joint thus formed is in the horizontal plane including the bases of the ports I. The sections 1 and 2 may be soldered together.

A bubble tube having the novel outlet orifice arrangement hereinbefore described possesses the advantage, among others, that the back pressure in the tube is substantially free from variations due to any disturbance in the liquid in which the tube is immersed. This advantage is of special importance in the case of the tube leg *ea* and particularly when it contains a fluid, such as wood pulp, including entrained solids. The tube also possesses the further, practical advantage of being relatively independent of tube-back-pressure variations developing on the making and breaking of bubbles.

A difficulty experienced in the use of bubble tubes is that the air pressure measured in the tube does not correspond precisely to any particular, physical depth of immersion of the tube. For example, with a tube open at its lower end and formed with a smooth horizontal lower edge, the measured air pressure in the tube will correspond to a depth of immersion which is not precisely equal to the distance between the lower end of the tube and the level of the liquid in which the tube is immersed. If small, tapered notches are formed in the lower end of the tube, the difference between the depth of immersion calculated from tthe tube pressure and the distance between the lower end of the tube and the level of the liquid in which the tube is immersed, is smaller than it is in the case of the tube having no notches. The distance between the immersion depth determined from the air pressure in the tube and the immersion depth indicated by the level of the open lower end of the tube, or indicated by lateral ports through which air is discharged, is referred to herein as an "off-set."

Tests have shown that if, with a tube of the character shown in Figs. 1–4, it be assumed that the depth of immersion is equal to the vertical distance between the level of the bases of the triangular notches I and the upper level of the liquid in which the tube is immersed, the "off-set" is less than it is with any other form of bubble tube having a multiplicity of lateral ports to minimize the effect of disturbances in the body of liquid in which the bubble tube is immersed.

The pressure developed in a bubble tube comprises three components; namely, the hydrostatic pressure due to depth of tube immersion, the hydrostatic pressure due to the depth of the bubble, and the pressure due to the surface tension of the bubble. In the experiments and tests which led to the conjoint use of a multiplicity of small circular orifices H above the closed lower end of a bubble tube and a row of triangular orifices I a short distance above the row of orifices H, it was found that with the bottom orifices H of a diameter slightly greater than ⅟₁₆ of an inch, the ratio of the area of the triangular ports to the area of the round ports H is not significant. It was found, moreover, that with apparatus of the character illustrated in Fig. 1, the best results were obtained when the upper orifices I were in the form of equilateral triangles having their sides about ³⁄₁₆ of an inch long. The number of triangles I needed to decrease the variations in the air pressure in a bubbler tube depends on the fluid in which the bubbler tube is immersed. For example, when the liquid in the container D is water, a tube having two triangular orifices I is substantially free from variations due to the making and breaking of the bubbles discharged through said orifices, and the use of four triangular orifices instead of two, resulted in an only negligible improvement. However, when the tube is immersed in material such as wood pulp stock having a density of the order of 1.16, an increase in the number of triangles above two materially decreased the pressure variation due to the making and breaking of the bubbles. In practice, satisfactory results are obtained with eight orifices I and eight orifices H, under all conditions of use.

In the operation of the apparatus shown in Fig. 1, it has been demonstrated that the closure G at the lower end of each bubble tube protects the tube from variations in pressure waves due to disturbances in the liquid *d* created to equalize the liquid composition in the tank D. The circular holes H below the triangular orifices I act as damping orifices for pressure waves, while permitting the bubble within the tube to feel the pressure outside of the tube and without significant effect on the intended operation of the orifices.

The overall tube design permits of the formation of a large protected bubble J, shown in Fig. 2 as having its concave, lower portion below the orifices I and above the orifices H. With the described arrangement, the up and down movement of the bubble J is too small to effect a significant variation in the back pressure when the bubbles discharged are made and broken.

The triangular orifices I are satisfactory from the operative standpoint and, when formed in the manner illustrated in Fig. 2, are practically desirable because of the comparative ease with which that form of construction can be accurately produced. However, I believe that operative results practically as good are obtainable with orifices of other shapes, but like the orifices I shown in Figs. 1–4, in that the uppermost portion of each orifice has oppositely inclined side edges extending downwardly from the apex at its upper end, as do the orifices IA of Fig. 5 and the orifice IB of Fig. 6. The orifice IA differs from the orifice I in that the lower edge of the orifice IA is formed by the concave side of a semi-circle having its ends connected to the lower end of the side edges of the upper portion of a tapered orifice portion like that shown in Fig. 2. The orifice IB is shown in Fig. 6 as a five point star with the apex of one point directly above the center of the star.

A common operating characteristic of the orifices I, IA and IB, is that the uppermost point of each orifice is the apex of an orifice portion having its side edges oppositely inclined to the vertical. Such orifices permit a relatively large number of small bubbles to form and break at random from the sharply pointed upper end of each orifice, thus assuring bubble stability and permitting the tearing away of each bubble without excessive back pressure due to surface tension.

The container C with its conduit connections serves the known purpose of suppressing, for measuring purposes, a portion of the difference between the air pressure in the tube EA and the air pressure within the bell A, and thereby facilitates the measurements of the density of the liquids in the chamber D. I have discovered that in measuring the gravity of a liquid such as water or wood pulp, which is much lower than that of mercury, the reference liquid may advantageously have a specific gravity of the order of 3.0, which is several times greater than that of water, but is less than one third of the specific gravity of mercury. One liquid, which may be used with advantage as a reference liquid, is tetrabromo methane, which has a specific gravity of about 3 and has the desirably high boiling point of 150° C., so that its evaporation rate is desirably low. Acetylene tetrabromide is another liquid having about the same specific gravity and boiling point as tetrabromo methane and is well adapted for use as the reference liquid.

The important practical characteristics of my novel bubble tube may be summarized as follows:

1. The sealed end of the bubble tube protects the bubble formed from pressure variations and waves due to disturbance in the liquid, such as those resulting from the operation of a mixer employed to prevent solids from settling out of the liquid whose gravity is to be measured, when that liquid is wood pulp, for example, and contains solids that tend to settle out of the liquid unless the latter is subject to practically continuous agitation.

2. The circular holes H below the triangular openings I serve as damping orifices which permit a bubble J formed in the bubble tube, as indicated in Fig. 2, to feel the pressure of the liquid outside the tube while being protected from pressure waves developing in the liquid in which the bubble tube is immersed.

3. The multiplicity of triangular orifices I arranged in a horizontal circular row permits small bubbles to form and break at random. The slanting of the walls of the orifices I, shown in Figs. 2 and 4 and hereinbefore described, permits of a relatively easy rupture of each bubble when the latter is in condition to break. It has been experimentally demonstrated that the operative effect of the row of triangular orifices I cannot be obtained by the replacement of said orifice by a single row or by two rows of round orifices.

While, in accordance with the provisions of the statutes, I have illustrated and described the best forms of embodiment of my invention now known to me, it will be apparent to those skilled in the art that changes may be made in the forms of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent is:

1. A bubble tube adapted to be filled with air under pressure and having a normally vertical, longitudinal axis and having a closed end for immersion in a liquid whose hydrostatic pressure is to be measured and comprising, a plurality of first ports extending substantially horizontally through the wall of said tube and spaced in a horizontal circle around the vertical axis of said tube and spaced vertically from the closed end of said tube, said ports conducting pressure from the liquid to the air in said tube and acting as damping orifices, and a plurality of triangular ports each extending through the wall of said tube and defined by a substantially horizontal bottom wall and a pair of upwardly extending side walls so arranged that the edge formed by the intersection between each of said side walls and the inner surface of said tube is shorter than the edge formed by the intersection between each of said side walls and the outer surface of said tube and the edge formed by the intersection of said side walls with one another extends upwardly from the inner to the outer surface of said tube, said triangular ports being spaced in a horizontal circle around the vertical axis of said tube and spaced vertically from said first ports a distance less than the distance said first ports are spaced from the closed end of said tube, said triangular ports serving to permit air to escape from the interior of said tube and to tear off in small bubbles.

2. In a specific gravity meter, a bubble tube having a closed lower end for immersion in a body of liquid whose gravity is to be measured and comprising a multiplicity of small ports equally spaced in a horizontal circle surrounding the tube axis and a multiplicity of triangular ports arranged in a horizontal circle about said axis at a level above the first mentioned ports, each triangular port having uprising, oppositely inclined walls, the lowermost wall being substantially horizontal and the vertically inclined walls joining at their upper ends to form an upwardly pointing apex, said walls forming a triangle of increasing area from the inside surface of the bubble tube to the outside surface thereof, the area of said triangle increasing more than the increase due to walls extending radially of the bubble tube.

References Cited in the file of this patent

UNITED STATES PATENTS

| 2,394,549 | Howe | Feb. 12, 1946 |
| 2,604,778 | Marquardt | July 29, 1952 |
| 2,668,438 | Marquardt | Feb. 9, 1954 |

FOREIGN PATENTS

| 654,785 | France | Dec. 7, 1928 |
| 689,882 | France | June 3, 1930 |

OTHER REFERENCES

Instrumentation, vol. 4, No. 4, 1st Quarter 1950, pages 11 and 12.